(12) United States Patent
Miyai et al.

(10) Patent No.: US 11,939,413 B2
(45) Date of Patent: Mar. 26, 2024

(54) ACRYLIC RESIN POWDER, RESIN COMPOSITION, HOT MELT ADHESIVE COMPOSITION CONTAINING ACRYLIC RESIN POWDER AND METHOD FOR PRODUCING SAME

(71) Applicant: Mitsubishi Chemical Corporation, Tokyo (JP)

(72) Inventors: Shogo Miyai, Tokyo (JP); Toru Kondo, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 728 days.

(21) Appl. No.: 17/031,988

(22) Filed: Sep. 25, 2020

(65) Prior Publication Data

US 2021/0009868 A1    Jan. 14, 2021

Related U.S. Application Data

(63) Continuation of application No. PCT/JP2019/012407, filed on Mar. 25, 2019.

(30) Foreign Application Priority Data

Mar. 26, 2018 (JP) ................................. 2018-058236

(51) Int. Cl.
| | |
|---|---|
| *C08F 265/06* | (2006.01) |
| *C08F 20/14* | (2006.01) |
| *C08G 18/62* | (2006.01) |
| *C08J 3/12* | (2006.01) |
| *C09J 133/12* | (2006.01) |
| *C09J 175/06* | (2006.01) |

(52) U.S. Cl.
CPC ............ *C08F 265/06* (2013.01); *C08F 20/14* (2013.01); *C08G 18/6225* (2013.01); *C08J 3/12* (2013.01); *C09J 133/12* (2013.01); *C09J 175/06* (2013.01); *C08J 2333/12* (2013.01); *C08J 2433/12* (2013.01)

(58) Field of Classification Search
CPC .................................. C08F 265/06; C08J 3/16
See application file for complete search history.

(56) References Cited

U.S. PATENT DOCUMENTS

| 6,559,236 | B1 | 5/2003 | Willimann et al. | |
|---|---|---|---|---|
| 2008/0167402 | A1* | 7/2008 | Ueda | C08J 3/16 |
| | | | | 523/352 |
| 2011/0294954 | A1* | 12/2011 | Fukutani | C08F 2/22 |
| | | | | 525/107 |
| 2014/0350186 | A1* | 11/2014 | Hatae | C08L 51/003 |
| | | | | 525/187 |
| 2015/0247013 | A1 | 9/2015 | Koyama et al. | |
| 2017/0283607 | A1* | 10/2017 | Keller | C08L 51/003 |
| 2017/0362368 | A1 | 12/2017 | Kitayama et al. | |
| 2019/0233562 | A1 | 8/2019 | Miyagawa | |

FOREIGN PATENT DOCUMENTS

| CN | 107250259 A | 10/2017 |
|---|---|---|
| EP | 2 896 652 A1 | 7/2015 |
| JP | 2002-521511 A | 7/2002 |
| JP | 2003-128736 A | 5/2003 |
| WO | WO 2018/012234 A1 | 1/2018 |

OTHER PUBLICATIONS

Fox Equation Calculations. https://wernerblank.com/equat/Fox_equation15.htm. As performed on Aug. 18, 2023. (Year: 2023).*

Chinese Decision of Rejection dated Mar. 18, 2023 in Chinese Patent Application No. 201980021889.2 (with English Translation), 11 pages.

Combined Chinese Office Action and Search Report dated Nov. 2, 2022 in Patent Application No. 201980021889.2 (with English machine translation), 14 pages.

Extended European Search Report dated Apr. 20, 2021 in corresponding European Patent Application No. 19775310.6, 7 pages.

International Search Report dated Jun. 25, 2019 in PCT/JP2019/012407 filed on Mar. 25, 2019, 3 pages (with English translation).

Japanese Office Action dated Dec. 10, 2019 in Japanese Patent Application 2019-520904, 10 pages (with English Machine translation).

* cited by examiner

*Primary Examiner* — Stephen E Rieth

(74) *Attorney, Agent, or Firm* — Oblon, McClelland, Maier & Neustadt, L.L.P.

(57) ABSTRACT

An acrylic resin powder soluble in acetone, including a multi-stage polymer (M) that includes a polymer (B) obtained by polymerizing a monomer mixture (b) containing methyl methacrylate and an alkyl (meth)acrylate ester (mb) in the presence of a polymer dispersion that contains a polymer (A) obtained by polymerizing a monomer mixture (a) containing an alkyl (meth)acrylate ester (ma), in which an alkyl group in the alkyl (meth)acrylate ester (ma) has 4 to 8 carbon atoms, an alkyl group in the alkyl (meth)acrylate ester (mb) has 4 to 8 carbon atoms, a glass transition temperature of the polymer (A) is 20° C. or lower, a glass transition temperature of the polymer (B) obtained by polymerizing the monomer mixture (b) is 55° C. or higher, and a mass average molecular weight of the multi-stage polymer (M) is 10,000 or more and 300,000 or less.

14 Claims, No Drawings

US 11,939,413 B2

ACRYLIC RESIN POWDER, RESIN COMPOSITION, HOT MELT ADHESIVE COMPOSITION CONTAINING ACRYLIC RESIN POWDER AND METHOD FOR PRODUCING SAME

The application is a continuation application of International Application No. PCT/JP2019/012407, filed on Mar. 25, 2019, which claims the benefit of priority of the prior Japanese Patent Application No. 2018-058236, filed Mar. 26, 2018, the content of which is incorporated herein by reference.

TECHNICAL FIELD

The present invention relates to an acrylic resin powder, a resin composition, and a hot melt adhesive composition containing the acrylic resin powder, and method for producing the same.

BACKGROUND ART

A hot melt adhesive is an adhesive that is solid or semi-solid at room temperature and melts and has fluidity when heated. In particular, adhesives containing a urethane prepolymer having an isocyanate group at a terminal as the main component are referred to as reactive hot melt adhesives, most of which are moisture-curable urethane adhesives, and usually in the form of a urethane prepolymer containing an isocyanate group, which is obtained by condensation-polymerizing a polyol component and an isocyanate component.

These reactive hot melt adhesives are applied onto a base material in a heat-melted state and, after cooling and solidifying, moisture curing occurs due to a chemical cross-linking reaction between an isocyanate group and water, thereby resulting in the formation of a film (adhesion layer) having high heat resistance and chemical resistance.

Conventional reactive hot melt adhesives exhibit excellent adhesiveness in a case where chemical cross-linking is formed by moisture curing. However, the reactive hot melt adhesive has almost no chemical cross-linking activity immediately after coating, and the initial adhesive strength to the base material is not sufficient due to the fluidity of the thermoplastic polymer, which is caused by the fact that the temperature of the adhesive is high immediately after heat-melting. The initial adhesive strength means the adhesive strength before moisture curing after being applied onto the base material. As a means for increasing the initial adhesive strength, a method in which a thermoplastic resin is mixed with a hot melt adhesive to improve the initial cohesive force is known. Patent Literature 1 discloses that the cohesive force and the adhesive strength of a urethane hot melt adhesive are improved by adding an acrylic resin.

On the other hand, an acrylic resin having a high mass average molecular weight and a high glass transition temperature is preferred for good initial adhesive strength, but a hot melt adhesive containing such an acrylic resin does not have a sufficiently long open time. The open time means a working time required for the adhesive to cool and solidify after being applied onto the base material. In this background, the development of an acrylic resin for a hot melt adhesive, which exhibits good initial adhesiveness and has a long open time, is desired.

CITATION LIST

Patent Literature

Patent Literature 1

PCT international Publication No. WO2018/012234

SUMMARY OF INVENTION

Technical Problem

The present invention has been made to solve such problems. That is, an object of the present invention is to provide an acrylic resin powder suitable for a hot melt adhesive which has a good initial adhesive strength and has a long open time as compared with conventional ones.

Solution to Problem

The present invention is as follows.

<1> An acrylic resin powder soluble in acetone, including a multi-stage polymer (M) that includes a polymer (B) obtained by polymerizing a monomer mixture (b) containing methyl methacrylate and an alkyl (meth)acrylate ester (mb) in the presence of a polymer dispersion that contains a polymer (A) obtained by polymerizing a monomer mixture (a) containing an alkyl (meth)acrylate ester (ma),
in which an alkyl group in the alkyl (meth)acrylate ester (ma) has 4 to 8 carbon atoms,
an alkyl group in the alkyl (meth)acrylate ester (mb) has 4 to 8 carbon atoms,
a glass transition temperature of the polymer (A) is 20° C. or lower,
a glass transition temperature of the polymer (B) is 55° C. or higher, and
a mass average molecular weight of the multi-stage polymer (M) is 10,000 or more and 300,000 or less.

<2> An acrylic resin powder soluble in acetone, including a multi-stage polymer (M) that includes a polymer (A) obtained by polymerizing a monomer mixture (a) containing an alkyl (meth)acrylate ester (ma) and a polymer (B) obtained by polymerizing a monomer mixture (b) containing methyl methacrylate and an alkyl (meth)acrylate ester (mb),
in which an alkyl group in the alkyl (meth)acrylate ester (ma) has 4 to 8 carbon atoms,
an alkyl group in the alkyl (meth)acrylate ester (mb) has 4 to 8 carbon atoms,
a glass transition temperature of the polymer (A) is 20° C. or lower,
a glass transition temperature of the polymer (B) is 55° C. or higher, and
a mass average molecular weight of the multi-stage polymer (M) is 10,000 or more and 300,000 or less.

<3> The acrylic resin powder according to <1> or <2>, in which a volume average particle diameter of primary particle is 0.1 to 10 µm.

<4> The acrylic resin powder according to any one of <1> to <3>, wherein a volume average particle diameter of secondary particle is 20 to 100 µm.

<5> The acrylic resin powder according to any one of <1> to <4>, in which the monomer mixture (a) further contains another copolymerizable monomer, and in the monomer mixture (a), a content of methyl methacrylate is 0% to 60% by mass, a content of the alkyl (meth)acrylate ester (ma) is 40% to 100% by mass, and a content of the other copolymerizable monomer is 0% to 10% by mass with respect to a total mass of the monomer mixture (a).

<6> The acrylic resin powder according to any one of <1> to <5>, in which the monomer mixture (b) further contains another copolymerizable monomer, and in the monomer mixture (b), a content of the methyl methacrylate is 50% to 90% by mass, a content of the alkyl (meth)acrylate ester (mb) is 10% to 50% by mass, and a content of the other copolymerizable monomer is 0% to 10% by mass with respect to a total mass of the monomer mixture (b).

<7> The acrylic resin powder according to any one of <1> to <6>, in which a content of a monomer unit derived from the polymer (A) is 10% to 80% by mass with respect to a total mass of a monomer unit constituting the multi-stage polymer (M).

<8> The acrylic resin powder according to any one of <1> to <7>, in which a content of the alkyl (meth)acrylate ester (ma) in the monomer mixture (a) is preferably 40% to 100% by mass with respect to a total mass of the monomer mixture (a).

<9> The acrylic resin powder according to any one of <1> to <8>, in which a content of methyl methacrylate in the monomer mixture (b) is preferably 50% to 90% by mass, more preferably 55% to 90% by mass, and still more preferably 65% to 90% by mass with respect to a total mass of the monomer mixture (b).

<10> The acrylic resin powder according to any one of <1> to <9>, in which a content of the alkyl (meth)acrylate ester (nib) in the monomer mixture (b) is preferably 10% to 50% by mass, more preferably 10% to 45% by mass, and still more preferably 10% to 35% by mass with respect to a total mass of the monomer mixture (b).

<11> The acrylic resin powder according to any one of <1> to <10>, in which, in a case where a monomer unit constituting the multi-stage polymer (M) is set to 100% by mass, a content of a monomer unit derived from the polymer (A) is preferably 10% to 80% by mass and more preferably 20% to 70%.

<12> The acrylic resin powder according to any one of <1> to <11>, in which, in a case where a monomer unit constituting the multi-stage polymer (M) is set to 100% by mass, a content of a monomer unit derived from the monomer mixture (b) is preferably 20% to 90% by mass and more preferably 30% to 80%.

<13> A resin composition obtained by dissolving the acrylic resin powder according to any one of <1> to <12> in a polyalkylene glycol.

<14> The resin composition according to <13>, in which the polyalkylene glycol has a number average molecular weight of 200 to 5,000.

<15> The resin composition according to <13> or <14>, further containing a polyester polyol.

<16> The resin composition according to any one of <13> to <15>, further containing an isocyanate.

<17> A hot melt adhesive containing the resin composition according to any one of <13> to <16>.

<18> A method for producing the acrylic resin powder according to any one of <1> to <12>, the method including: a step (I) of performing polymerization by dropwise adding a monomer mixture (b) containing methyl methacrylate and an alkyl (meth)acrylate ester (nib) and with respect to 100 parts by mass of the monomer mixture (b), to a polymer dispersion (A1) that contains a polymer (A) obtained by polymerizing a monomer mixture (a) of 0.1 to 3 parts by mass containing an alkyl (meth)acrylate ester (ma) and a chain transfer agent of 0.1 to 3 parts by mass with respect to 100 parts by mass of the monomer mixture (a), and obtaining a polymer dispersion (M1) that contains a multi-stage polymer (M); and a step (II) of spray-drying the polymer dispersion (M1) containing the multi-stage polymer (M) to obtain an acrylic resin powder, in which an alkyl group in the alkyl (meth)acrylate ester (ma) has 4 to 8 carbon atoms, and an alkyl group in the alkyl (meth)acrylate ester (mb) has 4 to 8 carbon atoms.

<19> The method for producing the acrylic resin powder according to <18>, in which the monomer mixture (a) further contains another copolymerizable monomer, and in the monomer mixture (a), a content of methyl methacrylate is 0% to 60% by mass, a content of the alkyl (meth)acrylate ester (ma) is 40% to 100% by mass, and a content of the other copolymerizable monomer is 0% to 10% by mass with respect to a total mass of the monomer mixture (a).

<20> The method for producing the acrylic resin powder according to <18> or <19>, in which the monomer mixture (b) further contains another copolymerizable monomer, and in the monomer mixture (b), a content of the methyl methacrylate is 50% to 90% by mass, a content of the alkyl (meth)acrylate ester (mb) is 10% to 50% by mass, and a content of the other copolymerizable monomer is 0% to 10% by mass with respect to a total mass of the monomer mixture (b).

<21> The method for producing the acrylic resin powder according to any one of <18> to <20>, in which a content of a monomer unit derived from the polymer (A) is 10% to 80% by mass with respect to a total mass of a monomer unit constituting the multi-stage polymer (M).

<22> The method for producing the acrylic resin powder according to any one of <18> to <21>, in which a content of the alkyl (meth)acrylate ester (ma) in the monomer mixture (a) is preferably 40% to 100% by mass with respect to a total mass of the monomer mixture (a).

<23> The method for producing the acrylic resin powder according to any one of <18> to <22>, in which a content of methyl methacrylate in the monomer mixture (b) is preferably 50% to 90% by mass, more preferably 55% to 90% by mass, and still more preferably 65% to 90% by mass with respect to a total mass of the monomer mixture (b).

<24> The method for producing the acrylic resin powder according to any one of <18> to <23>, in which a content of the alkyl (meth)acrylate ester (mb) in the monomer mixture (b) is preferably 10% to 50% by mass, more preferably 10% to 45% by mass, and still more preferably 10% to 35% by mass with respect to a total mass of the monomer mixture (b).

<25> The method for producing the acrylic resin powder according to any one of <18> to <24>, in which, in a case where a monomer unit constituting the multi-stage polymer (M) is set to 100% by mass, a content of a monomer unit derived from the polymer (A) is preferably 10% to 80% by mass and more preferably 20% to 70%.

<26> The method for producing the acrylic resin powder according to any one of <18> to <25>, in which, in a case where a monomer unit constituting the multi-stage polymer (M) is set to 100% by mass, a content of a monomer unit derived from the monomer mixture (b) is preferably 20% to 90% by mass and more preferably 30% to 80%.

<27> A method for producing a resin composition, the method including a step (III) of dissolving the acrylic resin powder obtained by the producing method according to any one of <18> to <26>, in a polyalkylene glycol.

<28> A method for producing a hot melt adhesive, the method including: a step (III) of dissolving the acrylic resin powder obtained by the producing method according to any one of <18> to <26>, in a polyalkylene glycol to obtain a resin composition; and a step (IV) of mixing the resin composition with an isocyanate to obtain a urethane prepolymer.

Advantageous Effects of Invention

The acrylic resin powder of the present invention can provide an acrylic resin powder suitable for a hot melt adhesive which has a good initial adhesive strength and has a long open time as compared with conventional ones.

DESCRIPTION OF EMBODIMENTS

Hereinafter, the present invention will be described in detail.

<<Acrylic Resin Powder>>

An acrylic resin powder of the present invention is acrylic resin powder soluble in acetone, including a multi-stage polymer (M) that includes a polymer (B) obtained by polymerizing a monomer mixture (b) containing methyl methacrylate and an alkyl (meth)acrylate ester (mb) in the presence of a polymer dispersion of a polymer (A) obtained by polymerizing a monomer mixture (a) containing an alkyl (meth)acrylate ester (ma), in which a glass transition temperature of the polymer (A) is 20° C. or lower, a glass transition temperature of the polymer (B) is 55° C. or higher, and a mass average molecular weight of the multi-stage polymer (M) is 10,000 or more and 300,000 or less.

In the present specification, the "multi-stage polymer" means a resin mixture containing the polymer (A) and the polymer (B), which is obtained by synthesizing the polymer (B) in the presence of the polymer (A). For example, the multi-stage polymer may have a core-shell structure in which the polymer (A) forms a core portion and the polymer (B) forms a shell portion.

Here, the glass transition temperature (hereinafter also referred to as "Tg") is a value obtained from the FOX equation (Equation (1)) as described below. In the present specification, the unit of Tg is "° C.". Specifically, in a case where a polymer is composed of only a single monomer (homopolymer), the standard analysis values described in "Polymer Data Handbook" edited by the Society of Polymer Science, Japan, or the like can be employed. In a case of a copolymer obtained by polymerizing n kinds of monomers, a value calculated from the Tg of a homopolymer of each monomer can be regarded as the glass transition temperature. Table 1 below shows the literature values of Tg of representative homopolymers.

TABLE 1

|        | Tg [° C.] |
|--------|-----------|
| MMA    | 105       |
| EMA    | 66        |
| n-BMA  | 20        |
| i-BMA  | 53        |
| t-BMA  | 107       |
| n-HMA  | −5        |
| 2-EHMA | −10       |
| MA     | 10        |
| EA     | −22       |
| n-BA   | −54       |
| n-HMA  | −57       |

TABLE 1-continued

|        | Tg [° C.] |
|--------|-----------|
| 2-EHA  | −50       |
| MAA    | 228       |
| 2-HEMA | 85        |

Abbreviations in the table indicate the following monomers.
"MMA": Methyl methacrylate
"EMA": Ethyl methacrylate
"n-BMA": n-butyl methacrylate
"i-BMA": i-butyl methacrylate
"t-BMA": t-butyl methacrylate
"n-HMA": n-hexyl methacrylate
"2-EHMA": 2-ethylhexyl methacrylate
"MA": Methyl acrylate
"EA": Ethyl acrylate
"n-BA": n-butyl acrylate
"n-HA": n-hexyl acrylate
"2-EHA": 2-ethylhexyl acrylate
"MAA": Methacrylic acid
"2-HEMA": 2-hydroxyethyl methacrylate $$1/(273+Tg)=\Sigma(W_n/(273+Tg_n)) \quad \text{(Equation (1))}$$

In the formula, $W_n$ represents the mass fraction of the monomer n, and $Tg_n$ represents the glass transition temperature (° C.) of the homopolymer of the monomer n. Here, the mass fraction is the proportion of the charge amount of the monomer n to the total charge amount of all the monomers.

The Tg of the polymer (A) is 20° C. or lower. In a case where the Tg of the polymer (A) is 20° C. or lower, the open time of the hot melt adhesive is long and thus good.

The Tg of the polymer (A) is preferably −20° C. to 20° C.

The Tg of the polymer (B) is 55° C. or higher, preferably 65° C. or higher, and more preferably 70° C. or higher. In a case where the Tg of the polymer (B) is 55° C. or higher, the initial adhesive strength of the hot melt adhesive is improved, and further, blocking due to heat fusion between the acrylic resin powders can be suppressed.

The Tg of the polymer (B) is preferably 55° C. to 115° C., more preferably 65° C. to 115° C., and still more preferably 70° C. to 115° C.

In addition, it is required that the acrylic resin powder that can be used in the present invention is soluble in acetone. The "acrylic resin powder is soluble in acetone" can be determined by the following method.

1.0 g of an acrylic resin powder is precisely weighed [$W_0$] in a 50 ml sample bottle, 40 ml of acetone is added thereto, and the resulting mixture is dispersed over 1 day. Then, using a centrifuge (high-speed cooling centrifuge, product name: CR22N/CR21N, manufactured by Hitachi Koki Co., Ltd.), centrifugation is performed at a rotation speed of 12,000 rpm for 60 minutes at a temperature of 2° C. Then, insoluble matter is separated from the soluble matter, acetone is added again to the insoluble matter to disperse the insoluble matter, centrifugation is performed in the same manner to completely separate the soluble matter and the insoluble matter. The insoluble matter after centrifugation is heated to 60° C. in an oven under a nitrogen atmosphere to remove acetone, vacuum dried at 60° C., the remaining insoluble matter is weighed [$W_1$], and the resultant amount is denoted by the proportion of acetone insoluble matter, that is, the gel fraction. The gel fraction is calculated by the following expression.

$$\text{Gel fraction (\% by mass)}=[W_1]/[W_0]\times 100$$

[$W_1$]; Amount of acetone insoluble matter
[$W_0$]; Amount of acrylic resin powder precisely weighed in a 50 ml sample bottle In a case where the gel fraction is 1% by mass or less, an acrylic resin powder is determined to be soluble in acetone.

(Copolymer Composition)

An alkyl (meth)acrylate ester (ma) and an alkyl (meth)acrylate ester (mb), which can be contained in the acrylic resin powder of the present invention, have an alkyl group having 4 to 8 carbon atoms. Examples of the monomeric alkyl (meth)acrylate ester include (meth)acrylic acid esters (for example, n-butyl (meth)acrylate, s-butyl (meth)acrylate, i-butyl (meth)acrylate, t-butyl (meth)acrylate, hexyl (meth)acrylate, cyclohexyl (meth)acrylate, and 2-ethylhexyl (meth)acrylate. It is noted that "(meth)acrylic acid" is a general term for acrylic acid and methacrylic acid.

Examples of the monomer other than the alkyl (meth)acrylate ester (ma) and the alkyl (meth)acrylate ester (mb) include: (meth)acrylic acid esters having an alkyl chain having 1 to 3 carbon atoms (for example, methyl (meth)acrylate, ethyl (meth)acrylate, and propyl (meth)acrylate); (meth)acrylic acid esters having a long alkyl chain having 9 or more carbon atoms (for example, stearyl (meth)acrylate); carboxyl group-containing monomers such as (meth)acrylic acid, itaconic acid, crotonic acid, maleic acid, fumaric acid, 2-succinoloyloxyethyl methacrylate, and 2-hexahydrophthaloyloxyethyl methacrylate; further, hydroxyl group-containing (meth)acrylic acid esters such as 2-hydroxyethyl (meth)acrylate, 2-hydroxypropyl (meth)acrylate; further, carbonyl group-containing (meth)acrylic acid esters such as acetoacetoxyethyl (meth)acrylate; and amino group-containing (meth)acrylic acid esters such as N-dimethylaminoethyl (meth)acrylate and N-diethylaminoethyl (meth)acrylate.

In the monomer mixture (a), the content of methyl methacrylate is preferably 0% to 60% by mass, the content of the alkyl (meth)acrylate ester (ma) is preferably 40% to 100% by mass, and the content of the other copolymerizable monomer is preferably 0% to 10% by mass with respect to a total mass of the monomer mixture (a).

Within the above range, the polymer (A) easily has a Tg of 20° C. or lower, and thus a hot melt adhesive having a long open time can be obtained.

In the monomer mixture (b), the content of methyl methacrylate is preferably 50% to 90% by mass, the content of the alkyl (meth)acrylate ester (mb) is preferably 10% to 50% by mass, and the content of the other copolymerizable monomer is preferably 0% to 10% by mass with respect to a total mass of the monomer mixture (b). In addition, in the monomer mixture (b), the content of methyl methacrylate is more preferably 55% to 90% by mass, the content of the alkyl (meth)acrylate ester (mb) is more preferably 10% to 45% by mass, and the content of the other copolymerizable monomer is more preferably 0% to 10% by mass with respect to a total mass of the monomer mixture (b).

Further, in the monomer mixture (b), the content of methyl methacrylate is more preferably 65% to 90% by mass, the content of the alkyl (meth)acrylate ester (mb) is more preferably 10% to 35% by mass, and the content of the other copolymerizable monomer is more preferably 0% to 10% by mass with respect to a total mass of the monomer mixture (b).

In a case where the contents are within the above ranges, the polymer (B) easily have a glass transition temperature of 55° C. or higher, the initial adhesive strength of the hot melt adhesive is improved, and further, blocking due to heat fusion between the acrylic resin powders can be suppressed.

In a case where a total amount of polymers constituting the multi-stage polymer (M) is set to 100% by mass, the content of the polymer (A) is preferably 10% to 80% by mass and more preferably 20% to 70%. In a case where the content of the polymer (A) is 10% by mass or more, the hot melt adhesive has a long open time. In a case where the content of the polymer (A) is 80% by mass or less, the initial adhesive strength is improved, and further, blocking due to heat fusion between the acrylic resin powders can be suppressed.

In a case where a total amount of polymers constituting the multi-stage polymer (M) is set to 100% by mass, the content of the polymer (B) is preferably 20% to 90% by mass and more preferably 30% to 80%. In a case where the content of the polymer (B) is 20% by mass or more, the initial adhesive strength is improved, and further, blocking due to heat fusion between the acrylic resin powders can be suppressed. In a case where the content of the polymer (B) is 90% or less, the hot melt adhesive has a long open time.

In the acrylic resin powder of the present invention, the monomer mixture (b) is polymerized in the presence of a polymer dispersion of the polymer (A) obtained by polymerizing a monomer mixture (a), and the multi-stage polymer (M) that includes the polymer (A) and the polymer (B) are included. Further, it is also possible to obtain a multi-stage polymer which is polymerized by adding another monomer mixture after the polymerization of the monomer mixture (a) or the monomer mixture (b), and the obtained multi-stage polymer can be used as the multi-stage polymer (M) as long as the functions of the polymer (A) and the polymer (B) are not impaired.

In addition, prior to the polymerization of the monomer mixture (a), another monomer mixture (s) may be polymerized as long as the functions of the polymer (A) and the polymer (B) are not impaired. Specifically, the polymer (A) is obtained by polymerizing the monomer mixture (a) in the presence of a polymer dispersion of a polymer (S) obtained by polymerizing a monomer mixture (s). The polymer (A) obtained here is presumed to be a graft polymer. The main component of the other monomer mixture (s) is preferably a (meth)acrylic acid ester obtained by esterification of an alcohol having 1 to 4 carbon atoms and a (meth)acrylic acid since hydrophilicity and hydrophobicity are properly balanced. Further, the usage amount (charge amount) of the other monomer mixture (s) is preferably 0% to 10% by mass with respect to the usage amount of all the monomers used for the synthesis of the multi-stage polymer (M).

(Mass Average Molecular Weight)

The mass average molecular weight of the multi-stage polymer (M) that can be used in the present invention is a converted value with respect to a standard polystyrene, which can be determined by the gel permeation chromatography (GPC) method. The mass average molecular weight of the multi-stage polymer (M) included in the acrylic resin powder of the present invention is 10,000 or more and 300,000 or less.

The mass average molecular weight of the multi-stage polymer (M) is preferably 20,000 or more and 200,000 or less. In a case where the mass average molecular weight of the multi-stage polymer (M) is 10,000 or more, the initial adhesive strength of the adhesive tends to be good. In a case where the mass average molecular weight of the multi-stage polymer (M) is 300,000 or less, the viscosities of the resin composition and the adhesive are suppressed, and further, the hot melt adhesive has a long open time.

(Volume Average Particle Diameter of Primary Particles)

The volume average particle diameter of primary particles of an acrylic resin powder that can be used in the present invention is preferably 0.1 to 10μm, more preferably 0.1 to 5 μM, and still more preferably 0.1 to 2 μm.

Here, the primary particles refer to polymer particles which have the minimum units constituting the acrylic resin powder. In a case where the volume average particle diameter of the primary particles is 10 μm or less, the surface area of the particles is large and the solubility in a medium such as a polyalkylene glycol is good. Further, in a case where the volume average particle diameter is 0.1 μm or more, the heat fusion of the volume average particle diameter of the secondary particles as powder is suppressed, and the dispersibility in a medium such as a polyalkylene glycol is good.

In the present invention, the volume average particle diameter of the primary particles of the acrylic resin powder is an averaged value of the particle diameters of the multi-stage polymer (M) in the polymer dispersion, measured by using a laser diffraction/scattering particle diameter distribution measuring apparatus (manufactured by Horiba, Ltd., product name: LA-960).

(Volume Average Particle Diameter of Secondary Particles)

The volume average particle diameter of secondary particles of an acrylic resin powder that can be used in the present invention is preferably 20 to 100 μm and more preferably 20 to 80 μm.

The secondary particles refer to aggregated particles obtained by aggregating a large number of primary particles. In a case where the volume average particle diameter is 20 μm or more, blowing of powder is suppressed and handling is improved. In a case where the volume average particle diameter is 100 μm or less, the solubility in a polyalkylene glycol is good.

In the present invention, the volume average particle diameter of the secondary particles of the acrylic resin powder is an averaged value of the particle diameters of the acrylic resin powder, measured by using a laser diffraction/scattering particle diameter distribution measuring apparatus (manufactured by Horiba, Ltd., product name: LA-960).

(Components Included in Acrylic Resin Powder)

An acrylic resin powder that can be used in the present invention may include an additive such as an antifoaming agent, as necessary.

<<Resin Composition>>

The resin composition of the present invention is obtained by dissolving the acrylic resin powder of the present invention in a polyalkylene glycol. The resin composition of the present invention can be included in a hot melt adhesive.

(Polyalkylene glycol)

As the polyalkylene glycol component, polyalkylene glycols having two or more glycol units such as a polymethylene glycol, a polyethylene glycol, a polypropylene glycol, a polyhexamethylene glycol, and a copolymer of ethylene oxide and propylene oxide, and branched polyalkylene glycols using polyfunctional alcohols such as glycerin are mentioned. These may be used alone or in a combination of two or more thereof.

The number average molecular weight of the polyalkylene glycol is preferably 200 to 5,000 and more preferably 400 to 3,000. In a case where the number average molecular weight of the polyalkylene glycol is 200 or more, the adhesive strength of the hot melt adhesive after curing is good. In a case where the number average molecular weight of the polyalkylene glycol is 5,000 or less, the viscosity of the resin composition is low and the coatability is good.

In the present specification, the number average molecular weight can be measured by a gel permeation chromatography (GPC) method.

(Polyester polyol)

The resin composition of the present invention may further contain a polyester polyol. As the polyester polyol, a crystalline polyester polyol and an amorphous polyester polyol are known, and specific examples of the polyester polyol include an aliphatic polyester polyol and an aromatic polyester polyol. The crystalline polyester polyol and the amorphous polyester polyol are easily distinguished by DSC. The melting point of the crystalline polyester polyol is observed as an endothermic peak when the temperature is raised and as an exothermic peak when the temperature is lowered, by DSC measurement.

In a case where the melting point of the amorphous polyester polyol is measured by DSC, an endothermic peak and an exothermic peak are not clearly observed, and thus the amorphous polyester polyol can be distinguished from the crystalline polyester polyol.

The aliphatic polyester polyol can be obtained by reacting an aliphatic dicarboxylic acid with a diol. Examples of the aliphatic dicarboxylic acid include adipic acid, sebacic acid, azelaic acid, and decamethylene dicarboxylic acid. These may be used alone or in a combination of two or more thereof.

Examples of the diol include low molecular weight diols having 2 to 12 carbon atoms, such as ethylene glycol, 1-methylethylene glycol, 1-ethylethylene glycol, propylene glycol, butanediol, pentanedial, hexanediol, heptanediol, octanediol, nonanediol, decanediol, dodecanediol, neopentyl glycol, 2-methyl-1,3-propanediol, cyclohexanedimethanol, and 2,4-dimethyl-1,5-pentanediol. Among them, at least one selected from ethylene glycol, butanediol, hexanediol, octanediol, and decanediol is preferred. These diols may be used alone or in a combination of two or more thereof.

Examples of the aliphatic polyester polyol include polyhexamethylene adipate, polyhexamethylene sebacate, polyhexamethylene dodecanoate, and polybutylene adipate.

The aromatic polyester polyol is preferably a polyol obtained by reacting an aromatic polycarboxylic or dicarboxylic acid with the diol described above. Examples of the aromatic polycarboxylic or dicarboxylic acid include phthalic acid, isophthalic acid, and terephthalic acid. These may be used alone or in a combination of two or more thereof. Examples of the aromatic polyester polyol include a polyalkylene phthalate, a polyalkylene isophthalate, and a polyalkylene terephthalate.

A polyether polyol has a low viscosity and easy handleability, and thus is suitable for dissolving an acrylic resin powder. Further, since the polyester polyol has high heat resistance, high solvent resistance, and high strength, it is preferable to use the polyalkylene glycol and the polyester polyol in combination.

(Isocyanate)

The resin composition of the present invention may further contain an isocyanate. Examples of the isocyanate include ethylene diisocyanate, ethylidene diisocyanate, propylene diisocyanate, butylene diisocyanate, hexamethylene diisocyanate, toluene diisocyanate, cyclopentylene-1,3-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, furfuridene diisocyanate, 1-chlorobenzene-2,4-diisocyanate, 4,4',4"-triisocyanate-triphenylmethane, 1,3,5-triisocyanate-benzene, 2,4,6-triisocyanate-toluene, and 4,4'-dimethyldiphenylmethane-2,2',5,5'-tetraisocyanate.

The average number of isocyanate groups contained in one molecule of the isocyanate is preferably 1 to 3. A difunctional isocyanate, so-called a diisocyanate is particularly preferable as the isocyanate. The isocyanates may be used alone or in a combination of two or more thereof. Among them, 4,4'-diphenylmethane diisocyanate is preferable from the viewpoint of high adhesive strength after moisture curing.

Although a monool, a monoisocyanate, a trifunctional polyol, or a trifunctional isocyanate can be used, a difunctional polyol (a diol) and a difunctional isocyanate (a diisocyanate) are preferred from the viewpoint of the viscosity of the resin composition.

In addition, it is preferable to use 2 moles of a bifunctional isocyanate with respect to 1 mole of a bifunctional polyol since the desired urethane prepolymer can be produced relatively easily.

<<Hot Melt Adhesive>>

An adhesive containing the resin composition of the present invention may be used as a hot melt adhesive.

The hot melt adhesive of the present invention contains the acrylic resin powder of the present invention and a polyalkylene glycol as a polyol component. The hot melt adhesive may further contain another polyol component other than the polyalkylene glycol and may contain an isocyanate.

The content of the acrylic resin powder is preferably 1% to 50% by mass and more preferably 5% to 30% by mass with respect to the total mass of the hot melt adhesive.

In a case where the hot melt adhesive of the present invention contains an acrylic resin powder, a polyol, and an isocyanate, the acrylic resin powder is preferably 1% to 50% by mass and the total amount of the polyol and the isocyanate is preferably 50% to 99% by mass, and further, the acrylic resin powder is more preferably 5% to 30% by mass and the total amount of the polyol and the isocyanate is more preferably 70% to 95% by mass, with respect to 100% by mass of the total amount of the acrylic resin powder, the polyol, and the isocyanate.

In a case where the amount of the acrylic resin powder is 1% by mass or more with respect to 100% by mass of the total amount of the acrylic resin powder, the polyol, and the isocyanate, the initial adhesive strength tends to be good. In addition, in a case where the content is 50% by mass or less, the adhesive strength after curing tends to be improved.

Examples of other additives to the hot melt adhesive of the present invention include: plasticizers such as dioctyl phthalate, dibutyl phthalate, and dioctyl adipate; antioxidants such as a phenol-based antioxidant, a phosphite-based antioxidant, a thioether-based antioxidant, and an amine-based antioxidant; pigments such as titanium oxide and carbon black; light stabilizers such as benzotriazole, a hindered amine, benzoate, benzotriazole; flame retardants such as a halogen-based flame retardant, a phosphorus-based flame retardant, an antimony-based flame retardant, and a metal hydroxide-based flame retardants; metal-based catalysts such as tin-based catalysts (trimethyltin laurate, trimethyltin hydroxide, dibutyltin dilaurate, dibutyltin maleate, and the like), lead-based catalysts (lead oleate, lead naphthenate, lead octenoate, and the like), other metal-based catalysts (metal naphthenates such as cobalt naphthenate), amine-based catalysts such as triethylenediamine, tetramethylethylenediamine, tetramethylhexylenediamine, asdiazabicycloalkenes, and dialkylaminoalkylamines, and curing catalysts such as bis(2-dimethylaminoethyl) ether and dimorpholinodiethyl ether; and wax such as paraffin wax and microcrystalline wax. Further, as necessary, a wetting agent, a viscosity improver, an antifoaming agent, a rheology adjusting agent, or the like can be added.

Method for Producing Acrylic Resin Powder

In the method for producing an acrylic resin powder of the present invention, the polymer (A) is formed by polymerization by dropwise adding the monomer mixture (a) containing the alkyl (meth)acrylate ester (ma) and a chain transfer agent of 0.1 to 3 parts by mass with respect to 100 parts by mass of the monomer mixture (a). For the polymerization of the monomer mixture (a), for example, an emulsion polymerization method, a seed polymerization method, a soap-free polymerization method, a dispersion polymerization method, a fine suspension polymerization method, or the like can be used. A polymer dispersion (M1) that contains the multi-stage polymer (M) that includes the polymer (A) and the polymer (B) is formed by polymerization by dropwise adding the monomer mixture (b) containing methyl methacrylate and the alkyl (meth)acrylate ester (mb) and a chain transfer agent of 0.1 to 3 parts by mass with respect to 100 parts by mass of the monomer mixture (b), to the obtained polymer dispersion of the polymer (A). Subsequently, the polymer dispersion (M1) that contains the multi-stage polymer (M) is pulverized by a spray-drying method, an acid coagulation process or salt coagulation process followed by a drying process, a freeze drying method, a centrifugal separation method, or the like and thereby an acrylic resin powder can be obtained. The spray-drying method is particularly preferred since it is possible to disperse homogeneously, as the primary particles, the aggregated particles by disrupting the higher-order structure by relatively weak shearing due to the fact that the primary particles do not firmly bind with each other.

In the method for producing an acrylic resin powder of the present invention, the polymer dispersion (M1) that contains the multi-stage polymer (M) that includes the polymer (A) and the polymer (B) is formed by polymerizing the monomer mixture (b) in the presence of the polymer dispersion of the polymer (A) obtained by polymerizing the monomer mixture (a). Further, it is also possible to produce the polymer dispersion (M1) that contains the multi-stage polymer (M) that includes the polymer (A), the polymer (B), and another polymer by performing polymerization by adding another monomer mixture after the polymerization of the monomer mixture (a) or the monomer mixture (b) as long as the functions of the polymer (A) and the polymer (B) are not impaired.

In addition, prior to the polymerization of the monomer mixture (a), another monomer mixture (s) may be polymerized as long as the functions of the polymer (A) and the polymer (B) are not impaired. The main component of the other monomer mixture (s) is preferably a (meth)acrylic acid ester of an alcohol having 1 to 4 carbon atoms and a (meth)acrylic acid since hydrophilicity and hydrophobicity are properly balanced. Further, it is preferable to use the usage amount (charge amount) of the other monomer mixture (s) within a range of 1% to 10% by mass with respect to the usage amount of all the monomers used for the synthesis of the multi-stage polymer (M).

The monomer mixture (a) contains the alkyl (meth)acrylate ester (ma), and the monomer mixture (b) contains methyl methacrylate and the alkyl (meth)acrylate ester (mb). The other copolymerizable monomers may include the same monomers as those described above.

In the monomer mixture (a), the content of methyl methacrylate is preferably 0% to 60% by mass with respect to the total mass of the monomer mixture (a).

In the monomer mixture (a), the content of the alkyl (meth)acrylate ester (ma) is preferably 40% to 100% by mass based with respect to the total mass of the monomer mixture (a).

In the monomer mixture (a), the content of the other copolymerizable monomer is preferably 0% to 10% by mass with respect to the total mass of the monomer mixture (a).

In the monomer mixture (b), the content of methyl methacrylate in the monomer mixture (b) is preferably 50% to 90% by mass, more preferably 55% to 90% by mass, and still more preferably 65% to 90% by mass with respect to a total mass of the monomer mixture (b).

In the monomer mixture (b), the content of the alkyl (meth)acrylate ester (mb) in the monomer mixture (b) is preferably 10% to 50% by mass, more preferably 10% to 45% by mass, and still more preferably 10% to 35% by mass with respect to a total mass of the monomer mixture (b).

In the monomer mixture (b), the content of the other copolymerizable monomer is preferably 0% to 10% by mass with respect to the total mass of the monomer mixture (b).

In a case where a total amount of polymers constituting the multi-stage polymer (M) is set to 100% by mass, the content of the polymer (A) is preferably 10% to 80% by mass and more preferably 20% to 70%. In a case where the content of the polymer (A) is 10% by mass or more, the hot melt adhesive has a long open time. In a case where the content of the polymer (A) is 80% by mass or less, the initial adhesive strength is improved, and further, blocking due to heat fusion between the acrylic resin powders can be suppressed.

In a case where a total amount of polymers constituting the multi-stage polymer (M) is set to 100% by mass, the content of the polymer (B) is preferably 20% to 90% by mass and more preferably 30% to 80%. In a case where the content of the polymer (B) is 20% by mass or more, the initial adhesive strength is improved, and further, blocking due to heat fusion between the acrylic resin powders can be suppressed. In a case where the content of the polymer (B) is 90% or less, the hot melt adhesive has a long open time.

(Chain Transfer Agent)

It is preferable to use a chain transfer agent for adjusting the molecular weight of a polymer to be obtained. Examples of the chain transfer agent include: mercaptans such as n-dodecyl mercaptan; thioglycolic acid esters such as octyl thioglycolate; and a-methylstyrene dimer and terpinolene. Among them, a primary or secondary mercapto compound is preferable since the physical properties of the hot melt adhesive using the acrylic resin powder obtained by polymerization are good.

Examples of the primary or secondary mercapto compound include: alkyl mercaptans such as n-butyl mercaptan, sec-butyl mercaptan, n-octyl mercaptan, n-dodecyl mercaptan, and n-octadecyl mercaptan; thiol thioglycolic acid esters such as 2-ethylhexyl thioglycolate, methoxybutyl thioglycolate, and trimethylolpropane tris(thioglycolate); and mercaptopropionic acid esters such as 2-ethylhexyl β-mercaptopropionate, 3-methoxybutyl β-mercaptopropionate, and trimethylolpropane tris (β-thiopropionate). These may be used alone or in a combination of two or more thereof. Among them, n-octyl mercaptan, n-dodecyl mercaptan, and 2-ethylhexyl thioglycolate, which have a large chain transfer constant, are preferred.

The usage amount of the chain transfer agent is preferably within a range of 0.1 to 3 parts by mass, and more preferably within a range of 0.3 to 2 parts by mass, with respect to 100 parts by mass of the monomer mixture (b). In a case where the usage amount of the chain transfer agent used is 0.1 parts by mass or more, the molecular weight of the copolymer is decreased by chain transfer of radicals, and thus the physical properties of the hot melt adhesive are improved. Further, in a case where the usage amount of the chain transfer agent is 3 parts by mass or less, the amount of the unreacted monomer and the chain transfer agent remaining reduced, and thus the odor reduced.

(Emulsifying Agent)

In a case of polymerizing in water, it is desirable to use an emulsifying agent. As the emulsifying agent, an anionic surfactant or a nonionic surfactant can be used. Specific examples of the anionic surfactant include an alkylbenzene sulfonate, an alkyl sulfonate, an alkyl sulfate ester salt, a fatty acid metal salt, a polyoxyalkyl ether sulfate ester salt, a polyoxyethylene carboxylic acid ester sulfate ester salt, and a polyoxyethylene alkylphenyl ether sulfate ester salt, and a succinic acid dialkyl ester sulfonate (for example, disodium dioctyl sulfosuccinate). These may be used alone or in a combination of two or more thereof.

Specific examples of the nonionic surfactant include compounds having a polyoxyethylene chain in the molecule and having surface activating ability, such as polyoxyethylene alkylphenyl ether, a polyoxyethylene alkyl ether, a polyoxyethylene fatty acid ester, a polyoxyethylene sorbitan fatty acid ester, a polyoxyethylene alkyl ether glycerin borate ester, a polyoxyethylene alkyl ether phosphate, and a polyoxyethylene, a compound in which each polyoxyethylene chain of these compounds is replaced by a copolymer of oxyethylene and oxypropylene, a sorbitan fatty acid ester, a fatty acid glycerin ester, a glycerin fatty acid ester, and pentaerythritol fatty acid ester. These may be used alone or in a combination of two or more thereof.

(Polymerization Initiator)

In a case of polymerizing in water, it is desirable to use a water-soluble radical polymerization initiator. Examples of the water-soluble radical polymerization initiator include: persulfates such as potassium persulfate, ammonium persulfate, and sodium persulfate; water-soluble azo compounds such as 2,2'-azobis(2-amidinopropane) trihydrochloride, 4,4'-azobis(4-cyanopentanoic acid); thermal decomposition-based polymerization initiators such as hydrogen peroxide; and redox-based polymerization initiators such as hydrogen peroxide and ascorbic acid, tert-butyl hydroperoxide and rongalite, potassium persulfate and a metal salt, and ammonium persulfate and sodium hydrogen sulfite. These polymerization initiators may be used alone or in a combination of two or more thereof.

<<Method for Producing Resin Composition>>

The resin composition can be obtained by dissolving the acrylic resin powder obtained by the producing method described above in a polyalkylene glycol. As a method of dissolution, for example, the acrylic resin powder can be dissolved by being added to a polyalkylene glycol, dispersed, and then heated and mixed.

The heating temperature is not particularly limited as long as it is a temperature at which the acrylic resin powder is dissolved, but the acrylic resin powder can be dissolved at a low temperature or at a short time as compared with a case of using an acrylic resin powder obtained by suspension polymerization. The acrylic resin powder and the polyester polyol may be simultaneously added and dissolved. After dissolution, it is preferable to add a defoaming agent as necessary and stir while heating under reduced pressure by using a vacuum pump or the like to sufficiently remove water in the resin composition.

As the polyalkylene glycol to be used, the same polyalkylene glycols as those exemplified in the section of the polyalkylene glycol, which may be contained in the resin composition of the present invention, can be used. A polyester polyol may be used together. As the polyester polyol to be used, the same polyester polyols as those exemplified in the section of the polyester polyol, which may be contained in the resin composition of the present invention, can be used.

A urethane prepolymer can be obtained by dissolving the acrylic resin powder obtained by the producing method described above in the polyalkylene glycol, and then adding an isocyanate and performing heating and mixing. The acrylic resin powder may be added to polyalkylene glycol and heated and mixed to dissolve the acrylic resin powder, or after the addition of the acrylic resin powder, the polyester polyol and the isocyanate may be added simultaneously and heated and mixed.

Other additives may be included as long as they do not adversely affect the reaction between the polyol forming the urethane prepolymer and the isocyanate. The timing of addition is not particularly limited, but for example, in a case of synthesizing a urethane prepolymer, the other additives may be added together with the polyol and the isocyanate, or the polyol and the isocyanate is reacted in advance to synthesize a urethane prepolymer and then the other additives may be added. As the additive, the same additives as those exemplified as the other additives to the hot melt adhesive can be used.

The heating temperature is preferably in a range of 80° C. to 140° C. and more preferably in a range of 90° C. to 110° C. Within this heating temperature range, the dissolution of each component is good, the viscosity is reduced, and the handleability is improved. Further, the reaction between the isocyanate and the polyalkylene glycol proceeds sufficiently.

<<Use of Resin Composition>>

The obtained resin composition of the present invention can be applied as a hot melt adhesive. In the present invention, the "hot melt adhesive" means an adhesive that is used after being heated at 80° C. to 150° C. to be melted. The hot melt adhesive of the present invention can be used in the fields where hot melt adhesives have been conventionally used, such as the field of building interior (or the field of building), the field of electronic materials, and the field of automobile interior.

The use of the hot melt adhesive, which is not particularly limited, is suitable for attaching an automobile interior member and for attaching a decorative material to a building interior member, and the hot melt adhesive can be also used for woodworking, paper processing, a general purpose, or the like.

The hot melt adhesive of the present invention can be used in the same manner as the method for the conventional hot melt adhesive, and the usage method is not particularly limited. Further, for example, in a case where an adherend is attached to the base material, the hot melt adhesive may be applied to the base material side and/or the adherend side.

The adherend and the base material may be those which are usually used, and examples thereof include a molding material, a film sheet, and a fibrous material obtained by knitting synthetic fibers or natural fibers in a sheet shape by a spinning machine.

The molding material, the film, and the sheet are not particularly limited, but a thermoplastic resin is preferred. Examples of the thermoplastic resin includes a polyolefin resin, a polyester resin, an acetate resin, a polystyrene resin, an ABS resin, a vinyl chloride resin, and a polycarbonate resin. Examples of the polyolefin resin include polyethylene and polypropylene, and examples of the polyester resin include polyethylene terephthalate.

A laminate product obtained by laminating the adherend and the base material with the hot melt adhesive of the present invention can be used for various uses, specifically, such as construction, electronic materials, and automobile fields. It is not necessary to use special equipment for producing the laminate product, and the laminate product can be produced using generally known production equipment including a transporter, a coater, a press, a heater, and a cutting machine. For example, the laminate product can be manufactured as follows. The base material or the adherend is coated with the hot melt adhesive of the present invention by a coater while the base material and the adherend are transported by a transporter. The temperature at the time of coating is controlled to a predetermined temperature by a heater. The adherend is slightly pressed to the base material by a pressing machine, and the adherend and the base material are laminated together through the hot melt adhesive. Subsequently, the adherend and the base material which have been laminated together are allowed to cool and are directly transported by the transporter to solidify the hot melt adhesive. Then, the base material to which the adherend is laminated is cut into a proper size by a cutting machine.

Since this laminate product has high initial adhesive strength of the hot melt adhesive of the present invention and excellent heat resistance after moisture curing, the base material and the adherend are hardly peeled off from each other even in the summer. Alternatively, an operator can apply the adhesive to manufacture a laminate product without using a coater.

EXAMPLES

Hereinafter, the present invention will be specifically described with reference to Examples. However, the present invention is not limited to these examples.

Various measurements and evaluation methods are as follows.

(Mass Average Molecular Weight)

A converted value with respect to a standard polystyrene measured by the gel permeation chromatography (GPC) method under the following conditions was denoted by the mass average molecular weight of a polymer.

High-speed GPC device (manufactured by Tosoh Corporation, product name: HLC-8220GPC)
Four columns (Tosoh Corporation, product name: TSKgel SuperHZM-M) connected in series are used.
Oven temperature: 40° C.
Eluent: tetrahydrofuran
Sample concentration: 0.1% by mass
Flow rate: 035 mL/min
Injection volume: 1 µL
Detector: RI (differential refractometer)

(Volume Average Particle Diameter)

The particle diameter of a polymer dispersion of the obtained polymer and the obtained acrylic resin powder was measured by using a laser diffraction/scattering particle diameter distribution measuring apparatus (manufactured by Horiba, Ltd., product name: LA-960). The median diameter (volume average particle diameter) was used for the particle diameter in the present specification. The relative refractive indices of the resin particles and the dispersion medium were all set to 1.12. Ion exchange water was used as the dispersion medium.

(Solubility in Acetone)

1.0 g of an acrylic resin powder was precisely weighed [$W_0$] in a 50 ml sample bottle, 40 ml of acetone was added thereto, and the resulting mixture was dispersed over 1 day. Then, using a centrifuge (high-speed cooling centrifuge, product name: CR22N/CR21N, manufactured by Hitachi Koki Co., Ltd.), centrifugation was performed at a rotation speed of 12,000 rpm for 60 minutes at a temperature of 2° C. to separate an insoluble matter from the soluble matter. Acetone was added again to disperse the insoluble matter, centrifugation was performed at a rotation speed of 12,000 rpm for 60 minutes at a temperature of 2° C., using a centrifuge (high-speed cooling centrifuge, product name: CR22N/CR21N, manufactured by Hitachi Koki Co., Ltd.) to completely separate the insoluble matter from the soluble matter. The insoluble matter after centrifugation was heated to 60° C. in an oven under a nitrogen atmosphere to remove acetone, vacuum dried at 60° C., and the remaining insoluble matter was weighed [$W_1$]. The resultant amount was denoted by the proportion of acetone insoluble matter, that is, the gel fraction. The gel fraction was calculated according to the following expression.

Gel fraction (% by mass)=[$W_1$]/[$W_0$]×100

[$W_1$]; Amount of acetone insoluble matter
[$W_0$]; Amount of acrylic resin powder precisely weighed in a 50 ml sample bottle In a case where the gel fraction was 1% by mass or less, an acrylic resin powder was determined to be soluble in acetone.

(Initial Adhesive Strength)

Two flat bars (made of wood, width: 1.7 cm, length: 7.5 cm, thickness: 1.5 mm) were prepared, and an area of 1.5 cm×1.7 cm of one bar was coated with a hot melt adhesive which had been heat-melted at 120° C. The other wooden flat bar was overlapped with the one bar and sandwiched with a double sided clip, and allowed to be left for 2 hours to cool and solidify the hot melt adhesive. Then, the double sided clip was removed, and a tensile shearing test was performed with the following tension tester to measure the initial adhesive strength.

Tension tester: Precision universal tester (product name: AGS-X, manufactured by Shimadzu Corporation)
Measurement conditions: Tension rate 5.0 mm/min
Distance between chucks 50 mm From the obtained measured values, the initial adhesive strength was evaluated according to the following criteria. The case where the initial adhesive strength was 100 kPa or more was regarded to be good.

A: 200 kPa or more.
B: 100 kPa or more and less than 200 kPa.
C: less than 100 kPa.

(Open Time)

A dried flat bar (made of wood, width: 1.7 cm, length: 7.5 cm, thickness: 1.5 mm) was coated with a hot melt adhesive, which had been heat-melted, and heated to 120° C. in a gear oven. Thereafter, a cycle of attaching, using finger pressure, and rapidly peeling off a piece of Kraft paper was repeated at intervals of 1 minute at room temperature. The open time was defined as the time from when the flat bar was coated with the hot melt adhesive to when no paper fiber remained on the surface of the adhesive when the piece of Kraft paper was peeled off. From the obtained measured values, the open time was evaluated according to the following criteria. The case where the open time was 15 minutes or more was regarded to be good.

A: 30 minutes or more.
B: 15 minutes or more and less than 30 minutes.
C: less than 15 minutes.

<Example 1> Acrylic Resin Powder (P-1)

[Step I (1)]

583 g of ion exchange water was put into a 2-liter four-necked flask equipped with a thermometer, a nitrogen gas introduction tube, a stirring rod, a dropping funnel, and a cooling tube, and aeration was performed with nitrogen gas for 30 minutes to substitute the dissolved oxygen in the ion exchange water. Then, aeration with nitrogen gas was stopped, and the temperature was raised to 80° C. while stirring at 200 rpm. When the internal temperature reached 80° C., a batch of a monomer mixture (s-1) consisting of 26.1 g of methyl methacrylate and 19.9 g of n-butyl methacrylate was added at one time, 0.80 g of potassium persulfate and 20 g of ion exchange water were added thereto, and the resultant mixture was kept for 45 minutes to obtain a polymer dispersion (S-1) of a polymer.

[Step I (2)]

0.32 g of PELEX OT-P (disodium dioctylsulfosuccinate, active ingredient: 70%, manufactured by Kao Corporation), 0.4 g of potassium persulfate, and 44 g of ion exchange water were added to the polymer dispersion (S-1) of a polymer, which had been obtained in [step I (1)], and at 15 minutes thereafter, an acrylic monomer mixture (a-1) consisting of 198.2 g of methyl methacrylate, 155.8 g of n-butyl acrylate, 2.8 g of PELEX OT-P, 3.76 g of n-octyl mercaptan, and 187.8 g of ion exchange water was dropwise added over 2.5 hours. The polymerization was completed by being kept at 80° C. for 1 hour, thereby obtaining a polymer dispersion (A-1) of a polymer. The polymerization was carried out in an environment in which aeration was performed with 25 ml of nitrogen gas per minute.

[Step I (3)]

An acrylic monomer mixture (b-1) consisting of 332.4 g of methyl methacrylate, 65.0 g of t-butyl methacrylate, 2.6 g of methacrylic acid, 3.1 g of PELEX OT-P, 4.2 g of n-octyl mercaptan, and 212.2 g of ion exchange water was dropwise added over 2.5 hours to the polymer dispersion (A-1) of a polymer, which had been obtained in [step I (2)]. The polymerization was completed by being kept at 80° C. for 1 hour, thereby obtaining a polymer dispersion (M-1) of a multi-stage polymer. The polymerization was carried out in an environment in which aeration was performed with 25 ml of nitrogen gas per minute.

[Step (II)]

This polymer dispersion (M-1) of a multi-stage polymer was spray-dried by using a spray dryer (manufactured by Okawara Kakohki Co., Ltd., product name: L-8i type) under the conditions of inlet temperature/outlet temperature=120° C./60° C. and a disk rotation speed of 20,000 rpm, thereby obtaining an acrylic resin powder (P-1).

The acrylic resin powder (P-1) had a mass average molecular weight of 44,000, a volume average particle diameter of primary particles of 0.70 μm, and a volume average particle diameter of secondary particles of 32.8 μm. The results are shown in Table 3.

<Example 2> Acrylic Resin Powder (P-2)

An acrylic resin powder (P-2) was produced in the same manner as in Example 1, except that the masses of the monomer mixtures (a) and (b) were set as shown in Table 2. The results are shown in Table 3.

<Example 3> Acrylic Resin Powder (P-3)

An acrylic resin powder (P-3) was produced in the same manner as in Example 1, except that the masses of the monomer mixtures (a) and (b) were set as shown in Table 2. The results are shown in Table 3.

<Example 4> Acrylic Resin Powder (P-4)

An acrylic resin powder (P-4) was produced in the same manner as in Example 1, except that the masses of the monomer mixtures (a) and (b) were set as shown in Table 2. The results are shown in Table 3.

<Example 5> Acrylic Resin Powder (P-5)

An acrylic resin powder (P-5) was produced in the same manner as in Example 1, except that the masses of the monomer mixtures (a) and (b) were set as shown in Table 2. The results are shown in Table 3.

<Example 6> Acrylic Resin Powder (P-6)

[Step I (2)]

3,510 g of ion exchange water was put into a 2-liter four-necked flask equipped with a thermometer, a nitrogen gas introduction tube, a stirrer, a dropping funnel, and a cooling tube, and aeration was performed with nitrogen gas for 30 minutes to substitute the dissolved oxygen in the ion exchange water. Then, aeration with nitrogen gas was stopped, and the temperature was raised to 65° C. while stirring at 200 rpm. When the internal temperature reached 65° C., a batch of a monomer mixture (a-1) consisting of 162.5 g of methyl methacrylate and 227.48 g of n-butyl acrylate was added at one time, 19.5 g of PELEX OT-P, 4.1 g of n-octyl mercaptan, 1.95 g of potassium persulfate, and 97.5 g of ion exchange water were added thereto, and the resultant mixture was kept for 30 minutes, the internal temperature was raised to 80° C., and the mixture was kept for 90 minutes to obtain a polymer dispersion (A-1) of a polymer.

[Step (I) (3)] and [Step (II)]

An acrylic resin powder (P-6) was produced in the same manner as in Example 1, except that the masses of the monomer mixtures (a) and (b) were set as shown in Table 2. The results are shown in Table 3.

<Comparative Example 1> Acrylic Resin Powder (P-7)

An acrylic resin powder (P-7) was produced in the same manner as in Example 1, except that the masses of the monomer mixtures (a) and (b) were set as shown in Table 2. The results are shown in Table 3.

<Comparative Example 2> Acrylic Resin Powder (P-8)

An acrylic resin powder (P-8) was produced in the same manner as in Example 1, except that the masses of the monomer mixtures (a) and (b) were set as shown in Table 2. However, in [step (II)], it was difficult to collect the acrylic resin powder because the resin was clogged inside the disk of the spray dryer due to heat fusion. The results are shown in Table 3.

<Comparative Example 3> Acrylic Resin Powder (P-9)

An acrylic resin powder (P-9) was produced in the same manner as in Example 1, except that the masses of the monomer mixtures (a) and (b) were set as shown in Table 2. The results are shown in Table 3.

<Comparative Example 4> Acrylic Resin Powder (P-10)

An acrylic resin powder (P-10) was produced in the same manner as in Example 1, except that the weight of the monomer mixture (a) was set as shown in Table 2 and [step (3)] was not performed. The results are shown in Table 3.

TABLE 2

| | Sample | | Example 1 P-1 | Example 2 P-2 | Example 3 P-3 | Example 4 P-4 | Example 5 P-5 | Example 6 P-6 |
|---|---|---|---|---|---|---|---|---|
| Step I (1) | Monomer mixture (s) (g) | MMA | 26.1 | 26.1 | 26.1 | 26.1 | 26.1 | — |
| | | n-BMA | 19.9 | 19.9 | 19.9 | 19.9 | 19.9 | — |
| | Polymerization initiator (g) | KPS | 0.8 | 0.8 | 0.8 | 0.8 | 0.8 | — |
| Step I (2) | Polymerization initiator (g) | KPS | 0.4 | 0.4 | 0.4 | 0.4 | 0.4 | 0.8 |
| (polymer (A)) | Monomer mixture (a) (g) | MMA | 198.2 | — | 65.8 | 147.5 | 118.8 | 62.5 |
| | | n-BMA | — | 462.6 | 25.1 | — | — | — |
| | | n-BA | 155.8 | 51.4 | 102.0 | 206.5 | 235.2 | 87.5 |
| | | MAA | — | — | 1.3 | — | — | — |
| | | 2-HEMA | — | — | — | — | — | — |
| | Emulsifying agent (g) | OT-P | 3.1 | 4.1 | 1.5 | 3.1 | 2.8 | 7.5 |
| | Chain transfer agent (g) | n-OM | 3.8 | 5.5 | 2.1 | 3.8 | 0.4 | 1.6 |
| | Ion exchange water (g) | | 187.8 | 272.6 | 102.9 | 187.8 | 187.8 | 1350.0 |
| Step I (3) | Polymerization initiator (g) | KPS | — | — | — | — | — | — |
| (polymer (B)) | Monomer mixture (b) (g) | MMA | 332.4 | 178.6 | 393.0 | 332.4 | 332.4 | 245.6 |
| | | n-BMA | — | — | 163.5 | — | — | 102.2 |
| | | i-BMA | — | 60.0 | — | — | — | — |
| | | t-BMA | 65.0 | — | — | 65.0 | 65.0 | — |
| | | MAA | 2.6 | 1.4 | 3.6 | 2.6 | 2.6 | 2.2 |
| | Emulsifying agent (g) | OT-P | 3.1 | 1.9 | 4.4 | 3.1 | 3.1 | — |
| | Chain transfer agent (g) | n-OM | 4.2 | 2.5 | 5.9 | 4.2 | 4.2 | 1.9 |
| | Ion exchange water (g) | | 212.2 | 127.3 | 297.1 | 212.2 | 212.2 | — |
| | Glass transition temperature (° C.) | | 106 | 91 | 76 | 106 | 106 | 76 |

TABLE 2-continued

|  |  |  | Comparative Example 1 P-7 | Comparative Example 2 P-8 | Comparative Example 3 P-9 | Comparative Example 4 P-10 |
| --- | --- | --- | --- | --- | --- | --- |
| Step I (1) | Monomer mixture (s) (g) | MMA | 26.1 | 26.1 | 26.1 | 26.1 |
|  |  | n-BMA | 19.9 | 19.9 | 19.9 | 19.9 |
|  | Polymerization initiator (g) | KPS | 0.8 | 0.8 | 0.8 | 0.8 |
| Step I (2) | Polymerization initiator (g) | KPS | 0.4 | 0.4 | 0.4 | — |
| (polymer (A)) | Monomer mixture (a) (g) | MMA | 221.3 | — | 147.5 | — |
|  |  | n-BMA | — | 674.0 | — | — |
|  |  | n-BA | 132.8 | — | 206.5 | — |
|  |  | MAA | — | — | — | — |
|  |  | 2-HEMA | — | — | 4.2 | — |
|  | Emulsifying agent (g) | OT-P | 2.8 | 5.3 | 2.8 | — |
|  | Chain transfer agent (g) | n-OM | 3.8 | 7.2 | — | — |
|  | Ion exchange water (g) |  | 187.8 | 187.8 | 187.8 | — |
| Step I (3) | Polymerization initiator (g) | KPS | — | — | — | 0.4 |
| (polymer (B)) | Monomer mixture (b) (g) | MMA | 332.4 | 56.1 | 332.4 | 529.1 |
|  |  | n-BMA | — | 23.3 | — | 220.1 |
|  |  | i-BMA | — | — | — | — |
|  |  | t-BMA | 65.0 | — | 65.0 | — |
|  |  | MAA | 2.6 | 0.5 | — | 4.8 |
|  | Emulsifying agent (g) | OT-P | 3.1 | 0.6 | 3.1 | 5.9 |
|  | Chain transfer agent (g) | n-OM | 4.2 | 0.9 | — | 8.0 |
|  | Ion exchange water (g) |  | 212.2 | 212.2 | 212.2 | 400.0 |
|  | Glass transition temperature (° C.) |  | 106 | 76 | 105 | 76 |

The compounds in Table indicate the following compounds.
"MMA": methyl methacrylate (manufactured by Mitsubishi Chemical Corporation)
"n-BMA": n-butyl methacrylate (manufactured by Mitsubishi Chemical Corporation)
"i-BMA": i-butyl methacrylate (manufactured by Mitsubishi Chemical Corporation)
"t-BMA": t-butyl methacrylate (manufactured by Mitsubishi Chemical Corporation)
"n-BA": n-butyl acrylate (manufactured by Mitsubishi Chemical Corporation)
"MAA": methacrylic acid (manufactured by Mitsubishi Chemical Corporation)
"2-HEMA": 2-hydroxyethyl methacrylate (manufactured by Mitsubishi Chemical Corporation)
"n-OM": n-octyl mercaptan (manufactured by FUJIFILM Wako Pure Chemical Corporation)
"KPS": Potassium persulfate (manufactured by Mitsubishi Gas Chemical Company Inc.)
"OT-P": PELEX OT-P, disodium dioctylsulfosuccinate, active ingredient: 70% (manufactured by Kao Corporation)

TABLE 3

|  | Sample | Example 1 P-1 | Example 2 P-2 | Example 3 P-3 | Example 4 P-4 | Example 5 P-5 | Example 6 P-6 |
| --- | --- | --- | --- | --- | --- | --- | --- |
| Polymer (A) | Glass transition temperature (° C.) | 14 | 10 | −6 | −7 | −18 | −7 |
| Polymer (B) | Glass transition temperature (° C.) | 106 | 91 | 76 | 106 | 106 | 76 |
| Multi-stage polymer (M) | Mass average molecular weight (×1,000) | 44 | 47 | 51 | 43 | 163 | 64 |
|  | Primary particle dimeter (volume average, μm) | 0.70 | 0.65 | 0.68 | 0.79 | 0.79 | 0.10 |
|  | Secondary particle dimeter (volume average, μm) | 33 | 25 | 25 | 29 | 42 | 24 |
|  | Ratio of polymer (A) (% by mass) | 44 | 64 | 24 | 44 | 44 | 30 |

|  | Sample | Comparative Example 1 P-7 | Comparative Example 2 P-8 | Comparative Example 3 P-9 | Comparative Example 4 P-10 |
| --- | --- | --- | --- | --- | --- |
| Polymer (A) | Glass transition temperature (° C.) | 24 | 20 | −7 | — |
| Polymer (B) | Glass transition temperature (° C.) | 106 | 76 | 105 | 76 |
| Multi-stage polymer (M) | Mass average molecular weight (×1,000) | 47 | 44 | 351 | 44 |
|  | Primary particle dimeter (volume average, μm) | 0.77 | 0.68 | 0.78 | 0.70 |
|  | Secondary particle dimeter (volume average, μm) | 36 | Could not be collected | 26 | 62 |
|  | Ratio of polymer (A) (% by mass) | 44 | 84 | 44 | 0 |

Example 7

[Dissolution Step]

41.1 g of polypropylene glycol having a mass average molecular weight of about 2,000 as a polyol (trade name: ADEKA POLYETHER P-2000, manufactured by ADEKA Corporation), 3.0 g of polypropylene glycol having a mass average molecular weight of about 400 (trade name: ADEKA POLYETHER P-400, manufactured by ADEKA Corporation), 0.3 g of "MODAFLOW 2100" (manufactured by DAICEL-ALLNEX Ltd.) as a defoaming agent, and 23.7 g of acrylic resin powder (P-1) were put into a 300 ml four-necked flask equipped with a thermometer, a stirring rod, and a cooling tube, heated such that the internal temperature reached 100° C., stirred for one hour, thereby obtaining a homogeneous resin composition having a solution form.

[Dehydration Step Under Reduced Pressure]

The resin composition was heated and stirred at 15 kPa and 100° C. for 1 hour, and dehydrated under reduced pressure.

24.5 g of polyester polyol "HS2H-351A" (a polyester polyol of hexanediol and adipic acid, manufactured by HOKOKU Co., Ltd., molecular weight: 3,500, melting point: 55° C., OHV=32 mgKOH/g) as a polyol, 7.0 g of 4,4'-diphenylmethane diisocyanate as an isocyanate, and 0.5 g of 2,2'-dimorpholinodiethyl ether (manufactured by Mitsui Fine Chemicals Inc.) as a curing catalyst were added thereto, and the mixture was stirred at 15 kPa and 100° C. for 3 hours. After subsequent cooling, the obtained hot melt adhesive was collected, sealed, and stored.

Examples 8 to 12

A hot melt adhesive was obtained in the same manner as in Example 7, except that only the kinds of the acrylic resin powders were changed as shown in Table 4. The results of initial adhesive strength and open time are shown in Table 4.

Comparative Examples 5 to 8

A hot melt adhesive was obtained in the same manner as in Example 7, except that only the kinds of the acrylic resin powders were changed as shown in Table 4. The results of initial adhesive strength and open time are shown in Table 4. However, in Comparative Example 6, the acrylic resin powder P-8 could not be collected, and thus the hot melt adhesive could not be obtained.

TABLE 4

| Acrylic resin powder | Kind | Example 7 P-1 | Example 8 P-2 | Example 9 P-3 | Example 10 P-4 | Example 11 P-5 | Example 12 P-6 |
|---|---|---|---|---|---|---|---|
| Initial adhesive strength | Strength (kPa) | 254 | 108 | 281 | 196 | 325 | 123 |
|  | Determination | A | B | A | B | A | B |
| Open time | Time (minutes) | 18 | >60 | 16 | >60 | 18 | 27 |
|  | Determination | B | A | B | A | B | B |

| Acrylic resin powder | Kind | Comparative Example 5 P-7 | Comparative Example 6 P-8 | Comparative Example 7 P-9 | Comparative Example 8 P-10 |
|---|---|---|---|---|---|
| Initial adhesive strength | Strength (kPa) | 336 | Could not be collected | 664 | 459 |
|  | Determination | A |  | A | A |
| Open time | Time (minutes) | 9 |  | 9 | 7 |
|  | Determination | C |  | C | C |

INDUSTRIAL APPLICABILITY

The acrylic resin powder of the present invention can provide an acrylic resin powder suitable for a hot melt adhesive which has a good initial adhesive strength and has a long open time as compared with conventional ones.

The invention claimed is:

1. An acrylic resin powder, comprising:
   a multi-stage polymer (M) comprising:
   a polymer (B) obtained by polymerizing a monomer mixture (b) in the presence of a polymer dispersion of
   a polymer (A) obtained by polymerizing a monomer mixture (a) containing 50% to 60% by mass of methyl methacrylate and an alkyl (meth)acrylate ester (ma);
   wherein
   the monomer mixture (b) comprises:
   50% to 90% by mass of methyl methacrylate,
   10% to 50% by mass of an alkyl (meth)acrylate ester (mb), and
   0% to 10% by mass of a copolymerizable monomer different from methyl methacrylate and the alkyl (meth)acrylate ester (mb),
   the alkyl group of the alkyl (meth)acrylate ester (ma) has 4 to 8 carbon atoms,
   the alkyl group of the alkyl (meth)acrylate ester (mb) bas 4 to 8 carbon atoms,
   a glass transition temperature of the polymer (A) is 20° C. or lower,
   a glass transition temperature of the polymer (B) is 55° C. or higher,
   the acrylic resin powder is soluble in acetone, and
   a mass average molecular weight of the multi-stage polymer (M) is 10,000 or more and 300,000 or less.

2. The acrylic resin powder according to claim 1, wherein a volume average particle diameter of a primary particle of the multistage polymer (M) is from 0.1 μm to 10 μm.

3. The acrylic resin powder according to claim 1, wherein a volume average particle diameter of secondary particles of the multistage polymer (M) is from 20 μm to 100 μm.

4. The acrylic resin powder according to claim 1, wherein the monomer mixture (a) comprises with respect to a total mass of the monomer mixture (a);
- from 50% to 60% by mass of methyl methacrylate; greater than 40% by mass of the alkyl (meth)acrylate ester (ma), and from 0% to 10% by mass of a copolymerizable monomer different from methyl methacrylate and the alkyl (meth)acrylate ester (ma) of.

5. The acrylic resin powder according to claim 1 wherein the polymer (A) is 10% to 80% by mass in a case where a total amount of polymers constituting the multi-stage polymer (M) is set to 100% by mass.

6. A method for producing the acrylic resin powder according to claim 1, comprising:
- performing polymerization to form a polymer (B) by dropwise adding a monomer mixture (b) to a polymer dispersion (A1) that contains a polymer (A) obtained by polymerizing a monomer mixture (a) containing 50% to 60% by mass of methyl methacrylate and an alkyl (meth)acrylate ester (ma) and a chain transfer agent of 0.1 to 3 parts by mass with respect to 100 parts by mass of the monomer mixture (a), to obtain a polymer dispersion (M1) that contains the multi-stage polymer (M) that includes the polymer (A) and the polymer (B); and
- spray-drying the polymer dispersion (M1) containing the multi-stage polymer (M) to obtain an acrylic resin powder, wherein
the monomer mixture (h) comprises:
50% to 90% by mass of methyl methacrylate
10% to 50% by mass of an alkyl (meth)acrylate ester (mb),
0% to 10% by mass of a copolymerizable monomer different from methyl methacrylate and the alkyl (meth)acrylate ester (mh), and
a chain transfer agent of 0.1 to 3 parts b mass with respect to 100 parts by mass of the monomer mixture (b),
the alkyl group of the alkyl (meth)acrylate ester (ma) has 4 to 8 carbon atoms, and
the alkyl group of the alkyl (meth)acrylate ester (mb) has 4 to 8 carbon atoms.

7. The method for producing the acrylic resin powder according to claim 6, wherein the monomer mixture (a) comprises with respect to a total mass of the monomer mixture (a):
- from 50% to 60% by mass of methyl methacrylate; greater than 40% by mass of the alkyl (meth)acrylate ester (ma); and
- from 0% to 10% by mass of a copolymerizable monomer different from methyl methacrylate and the alkyl (meth)ylate ester (ma).

8. The r ethod for producing the acrylic resin powder according to claim 6, wherein a content of the polymer (A) is 10% to 80% by mass with respect to a total mass of the multi-stage polymer (M).

9. A resin composition., comprising: a solution of the acrylic resin powder according to claim 1 in a polyalkylene glycol.

10. The resin composition according to claim 9, wherein the polyalkylene glycol has a number average molecular weight of 200 to 5000.

11. The resin composition according to claim 9, further comprising:
a polyester polyol.

12. A method for producing a resin composition, comprising:
dissolving the acrylic resin powder obtained by the method according to claim 6, in a polyalkylene glycol.

13. A hot melt adhesive comprising a urethane prepolymer obtained by mixing the resin composition according to claim 9 with an isocyanate.

14. A method for producing a hot melt adhesive, comprising:
dissolving the acrylic resin powder obtained by the method according to claim 6, in a polyalkylene glycol to obtain a resin composition; and
mixing the resin composition with an isocyanate to obtain a urethane prepolymer.

* * * * *